US010839382B2

(12) United States Patent
Holden

(10) Patent No.: US 10,839,382 B2
(45) Date of Patent: Nov. 17, 2020

(54) AUTHENTICATION AND SECURE TRANSMISSION OF DATA BETWEEN SIGNATURE DEVICES AND HOST COMPUTERS USING TRANSPORT LAYER SECURITY

(71) Applicant: Wacom Co., Ltd., Kazo (JP)

(72) Inventor: Martin Holden, Melksham (GB)

(73) Assignee: Wacom Co., Ltd., Kazo (JP)

( * ) Notice: Subject to any disclaimer, the term of this patent is extended or adjusted under 35 U.S.C. 154(b) by 140 days.

(21) Appl. No.: 15/690,133

(22) Filed: Aug. 29, 2017

(65) Prior Publication Data

US 2018/0060608 A1 Mar. 1, 2018

Related U.S. Application Data

(60) Provisional application No. 62/381,430, filed on Aug. 30, 2016.

(51) Int. Cl.
*H04L 29/06* (2006.01)
*G06Q 20/38* (2012.01)
(Continued)

(52) U.S. Cl.
CPC ....... *G06Q 20/38215* (2013.01); *G06F 21/64* (2013.01); *G06F 21/83* (2013.01);
(Continued)

(58) Field of Classification Search
CPC .......... G06F 21/64; G06F 21/83; G06F 21/82; G06Q 20/38215; G07F 7/1041;
(Continued)

(56) References Cited

U.S. PATENT DOCUMENTS 7,010,147 B2 * 3/2006 Silverbrook ........... B65H 29/34
382/119
7,933,840 B2 4/2011 Zank
(Continued)

FOREIGN PATENT DOCUMENTS

CN 103888422 A 6/2014
CN 204442397 U 7/2015

OTHER PUBLICATIONS

Extended European Search Report dated Feb. 13, 2018, issued in corresponding European Application No. 17187244.3, 18 pages.
(Continued)

*Primary Examiner* — Saleh Najjar
*Assistant Examiner* — Feliciano S Mejia
(74) *Attorney, Agent, or Firm* — Christensen O'Connor Johnson Kindness PLLC

(57) ABSTRACT

A transport layer security (TLS) connection is established between a signature device and the host computer via an interface (e.g., a universal serial bus (USB) interface). The signature device acts as a TLS server, and the host computer acts as a TLS client. Data such as pen data, control data, or image data may be received or transmitted via a USB bulk transfer mechanism. In one aspect, the host computer sends a command via the interface to the signature device to generate a new key pair, receives a certificate signing request (CSR) from the signature device via the interface, sends the CSR to a user certificate authority, receives a public key certificate from the user certificate authority, and sends the public key certificate to the signature device via the interface.

20 Claims, 12 Drawing Sheets

(51) Int. Cl.
*G07F 7/10* (2006.01)
*H04L 9/32* (2006.01)
*H04L 9/08* (2006.01)
*H04W 12/06* (2009.01)
*G06F 21/64* (2013.01)
*G06F 21/83* (2013.01)
*G06F 21/82* (2013.01)

(52) U.S. Cl.
CPC .......... *G07F 7/1016* (2013.01); *G07F 7/1041* (2013.01); *H04L 9/0838* (2013.01); *H04L 9/0866* (2013.01); *H04L 9/3247* (2013.01); *H04L 9/3268* (2013.01); *H04L 63/061* (2013.01); *H04L 63/0823* (2013.01); *H04L 63/20* (2013.01); *H04W 12/0609* (2019.01); *G06F 21/82* (2013.01)

(58) Field of Classification Search
CPC ... G07F 7/1016; H04L 9/3268; H04L 9/0866; H04L 63/20; H04L 9/0838; H04L 63/061; H04L 9/3247; H04L 63/0823; H04W 12/06
See application file for complete search history.

(56) References Cited

U.S. PATENT DOCUMENTS

| | | | | |
|---|---|---|---|---|
| 8,285,991 | B2* | 10/2012 | Scheidt | H04L 9/3231 380/259 |
| 8,423,476 | B2* | 4/2013 | Bishop | G06Q 20/027 705/66 |
| 8,578,467 | B2* | 11/2013 | Ronda | H04L 9/3263 726/10 |
| 8,700,905 | B2 | 4/2014 | Guenther | |
| 8,862,874 | B2* | 10/2014 | Hazlewood | H04L 63/0823 713/156 |
| 9,118,467 | B2* | 8/2015 | Maletsky | H04L 9/3268 |
| 9,762,569 | B2* | 9/2017 | Schneider | H04L 9/3265 |
| 9,819,661 | B2* | 11/2017 | Stern | H04L 63/06 |
| 9,898,100 | B2* | 2/2018 | Ribeiro | G06F 21/35 |
| 9,959,576 | B2* | 5/2018 | Hurry | G06Q 20/40 |
| 10,042,993 | B2* | 8/2018 | Beigi | H04L 9/3236 |
| 10,074,224 | B2* | 9/2018 | Ho | G07C 9/00309 |
| 2006/0037067 | A1 | 2/2006 | Morris et al. | |
| 2011/0161659 | A1* | 6/2011 | Himawan | G06F 21/33 713/156 |
| 2011/0173558 | A1* | 7/2011 | Yeh | G06F 3/018 715/773 |
| 2011/0202762 | A1* | 8/2011 | Hadad | G06Q 20/388 713/164 |
| 2015/0154414 | A1 | 6/2015 | Pike | |
| 2015/0236860 | A1* | 8/2015 | Brown | H04L 9/3268 713/156 |
| 2016/0094539 | A1* | 3/2016 | Suresh et al. | H04L 9/3263 713/158 |
| 2016/0219079 | A1* | 7/2016 | Justin | H04L 63/0245 |
| 2017/0078711 | A1* | 3/2017 | Martens | H04N 21/4181 |
| 2018/0048639 | A1* | 2/2018 | Wundsam | G06F 9/4401 |

OTHER PUBLICATIONS

"USB in a NutShell," Beyond Logic, ©2010, Chapter 4, <http://www.beyondlogic.org/usbnutshell/usb4.shtml> [retrieved Jun. 22, 2016], 8 pages.
Partial European Search Report dated Oct. 27, 2017, issued in corresponding European Application No. 17187244.3, 16 pages.
Office Action dated May 29, 2019, issued in corresponding European Application No. 17187244.3, filed Aug. 22, 2017, 4 pages.
"Device Certificates on Polycom® Phones" Polycom Feature Profile 37148, Jul. 2012, 18 pages.

* cited by examiner

AUTHENTICATION AND SECURE TRANSMISSION OF DATA BETWEEN SIGNATURE DEVICES AND HOST COMPUTERS USING TRANSPORT LAYER SECURITY

CROSS-REFERENCE TO RELATED APPLICATION

This application claims the benefit of U.S. Provisional Application No. 62/381,430, filed Aug. 30, 2016, which is hereby incorporated by reference.

BACKGROUND

Electronic handwriting is increasingly important in a variety of contexts. For example, electronic handwriting is now commonly used in place of pen and paper to obtain a credit card holder's affirmation of a credit card transaction. As another example, signature pads and tablets are used in banks, retail stores, and other locations to obtain signatures on legally binding documents. Given the sensitive nature of such applications, authentication of signature devices and security of data being transferred between signature devices and other computers has become a critical issue for suppliers and users of such devices.

U.S. Pat. No. 8,700,905 discloses, for example, a signature capture apparatus that captures a handwritten signature and encrypts the signature data. U.S. Pat. No. 7,933,840 discloses, for example, a signature device that encrypts signature data with transaction data provided by a host computer.

Proprietary security and encryption schemes are possible, but they require significant effort and expense, as well as a high level of trust between designers of such schemes and their customers.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a connection is established between a signature device and a host computer via an interface (e.g., a universal serial bus (USB) interface), and a transport layer security (TLS) connection is established between the signature device and the host computer via the interface. The host computer sends a command via the interface to the signature device to generate a new key pair, receives a certificate signing request (CSR) from the signature device via the interface, sends the CSR to a user certificate authority (CA), receives a public key certificate from the user CA, and sends the public key certificate to the signature device via the interface.

In another aspect, a connection is established between a signature device and a host computer via a USB interface, and a TLS connection is established between the signature device and the host computer via the USB interface. The signature device acts as a TLS server, and the host computer acts as a TLS client.

In another aspect, a TLS connection is established (e.g., via a USB interface) between a signature device and a host computer running an application. The host computer selects an image file from a set of image files (e.g., representing different layouts of characters for entering a PIN) stored in the host computer. Each image file in the set of image files has a different mapping between image regions and a character alphabet. The host computer encrypts the selected image, sends the selected image to the signature device over the TLS connection, receives encrypted pen data (e.g., representing user selection of characters in a PIN) from the signature device over the TLS connection, decrypts the encrypted pen data, and identifies at least one character based on the decrypted pen data and the mapping between image regions and the character alphabet associated with the selected image file.

In another aspect, after a TLS connection is established (e.g., via a USB interface) between a signature device and a host computer running an application, the signature device receives an encrypted image selected from a set of images stored in the host computer over the TLS connection, decrypts the encrypted image, and sends encrypted pen data to the host computer over the TLS connection. Each image in the set of images has a different mapping between image regions and a character alphabet, and the encrypted pen data represents user selection of characters in a PIN.

In another aspect, a signature tablet for use with an external computer comprises a sensor module configured to obtain a series of pen data and a controller configured to generate a public key and a private key, obtain a third party certificate for the public key, establish a secure connection with the external computer by using the public key signed by the third party, and send the series of pen data over the secure connection as the series of pen data is obtained.

In some aspects, data such as pen data, control data, or image data may be received or transmitted via a USB bulk transfer mechanism.

In another aspect, a signature tablet communicates with an external computer. The signature tablet comprises an input sensor (e.g., an electromagnetic resonance (EMR) sensor), an input sensor controller (e.g., an EMR controller), and a main controller. The main controller comprises a peripheral device interface (e.g., a USB interface) and memory. The signature tablet also may include a display (e.g., an LCD display). The input sensor controller is configured to detect a series of positions of a pen and generate a series of pen data. The memory stores a key pair of a public key and a private key, a server certificate for the public key, and firmware. The firmware is configured to cause the main controller to establish a connection with the external computer over the peripheral device interface when the peripheral device interface is detected to be connected with the external computer, provide the server certificate including the public key to the external computer over the connection, and, in case a response indicating the server certificate is trusted by the external computer is received, send the series of pen data to the external computer. The external computer may be programmed to receive the server certificate including the public key over the connection, determine whether the server certificate is trusted or not, send the response indicating the server certificate is trusted to the signature tablet in a case where the server certificate is trusted, and receive the series of pen data.

The firmware may be further configured to cause the main controller to receive an encrypted shared secret key generated by the external computer over the connection (e.g., via a secure TLS or SSL (Secure Sockets Layer) session established directly via the connection over the USB peripheral device interface) as the response indicating the server certificate is trusted by the external computer; and send the series of pen data by encrypting the series of pen data with the shared secret key. The firmware may be further configured to cause the main controller to establish a default pipe for exchanging USB device properties and two pipes for USB bulk transfer for two-way communication with the external computer over the peripheral device interface. The series of pen data may be sent over the TLS session established via the two pipes for USB bulk transfer.

The signature tablet may issue a CSR. For example, the firmware may be further configured to cause the main controller to generate a first key pair in response to a command, send a CSR for the public key in order to obtain the server certificate signed by a CA, and store the server certificate including the public key in the memory. The firmware may be further configured to cause the main controller to generate a new key pair of a new public key and a new private key in response to another command, send a CSR for the new public key in order to obtain the public key signed by a second CA, and update the memory to store the new key pair and a server certificate for the new public key signed by the second CA.

For mutual authentication, the firmware may be further configured to cause the main controller to retrieve a client certificate including a public key of the external computer from the external computer, determine whether the client certificate is trusted or not, and, in case the client certificate is trusted and the response indicating that the server certificate is trusted by the external computer is received, send the series of pen data to the external computer.

For PIN entry, the firmware may be further configured to cause the signature tablet to decrypt encrypted image data sent from the external computer over the connection to obtain image data, and display a path of the positions of the pen in a manner such that the path is overlaid with the image data when displayed on the display. The image data may represent either a first image for entering a handwriting signature or a second image showing a layout of characters for entering a PIN. The firmware may be further configured to cause the signature tablet to display the path of the positions of the pen in a manner such that the path is overlaid with the first image, and display a character selected by the positions in a highlighted manner.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
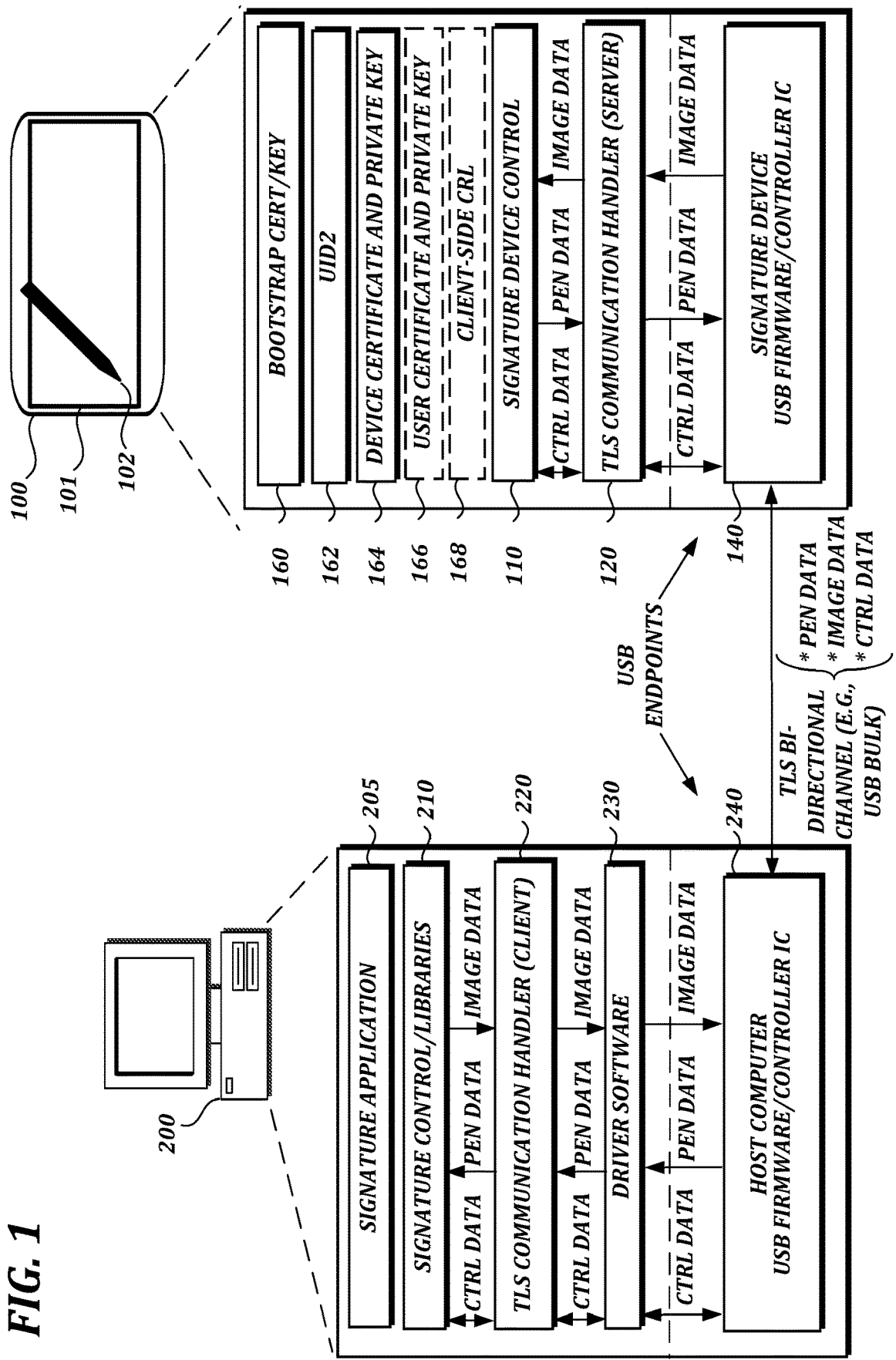
FIG. 1 is a block diagram of an illustrative system in which described embodiments may be implemented.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

I. INTRODUCTION

As noted above, U.S. Pat. No. 8,700,905 discloses, for example, a signature capture apparatus that captures a handwritten signature and encrypts the signature data, and U.S. Pat. No. 7,933,840 discloses, for example, a signature device which encrypts signature data with transaction data provided by a host computer. However, no practical solutions have been provided for a mechanism for authentication (either one-way or two-way) between a signature tablet and a host computer. Using a pre-shared key or temporary shared transaction data as an encryption key is not enough to protect against man-in-the-middle attacks, or to account for situations in which a signature tablet has been replaced by a third party before the tablet has been newly installed (e.g., in a bank or user site) after the signature tablet has been shipped from the manufacturer.

Further, although data can be transmitted via USB (Universal Serial Bus) from a signature device to a host PC, to protect the transmission it has previously been necessary to use a complex approach of providing different encryption schemes for encrypting and transmitting various types of data (e.g., configuration or control data, pen data, image data, or other data) using various USB transfer mechanisms (e.g., control transfers, interrupt transfers). A simpler scheme for securely transmitting data over USB is desirable.

In general computing, TLS (Transport Layer Security) is an industry standard protocol for protection of bi-directional communication channels. Formerly known as SSL (Secure Sockets Layer), TLS is often used in web browsers and web servers to protect TCP/IP links as secure HTTPS connections. TLS may be implemented using open-source libraries and toolkits, such as OpenSSL, provided by the OpenSSL Software Foundation, or wolfSSL (formerly CyaSSL), provided by wolfSSL Inc. A current version of the TLS standard, TLS 1.2, is defined in RFC 5246, which is a document available from the Internet Engineering Task Force (IETF).

TLS uses public key cryptography, which requires assurance that the party encrypting the message is using the encryption algorithm of the correct party. Otherwise, the message may be vulnerable to man-in-the-middle attacks in which an unauthorized party impersonates the actual parties to the transaction, allowing the unauthorized party to view an unencrypted message. PKI (public key infrastructure) provides a solution in the form of a trusted certification authority (CA). The CA provides a public key certificate for the message. The public key certificate includes the CA's digital signature along with a party's public key and a text string identifier of the party. The public key certificate assures the encrypting party that the public key belongs to the intended recipient.

However, despite the existence of protocols like TLS in general computing applications, no easy solution has been found for securing communication channels in the specialized field of electronic signature devices.

In embodiments described herein, solutions for one or more of the technical problems described above are provided. For example, in some embodiments a TLS protocol is used for authentication and to protect links between signature devices and the computers they communicate with. Using TLS for these purposes has several advantages. For example, data can be protected in both directions between the signature device the computer it is communicating with. As another example, TLS is an industry standard that is well supported and understood, and it may be implemented using open-source libraries and toolkits, such as OpenSSL or wolfSSL.

Signature devices often communicate with other computers using USB ports. In described embodiments, TLS is used for authentication over USB and to protect the USB connection between signature devices and other computers. Described embodiments also allow mutual authentication between signature devices and other computers over USB channels.

Described embodiments can be used to provide mutual authentication of signature devices and the computers they communicate with, and as a defense against security breaches such as attempted connection of unauthorized computers to signature devices and malicious hijacking of USB connections.

The present disclosure provides different levels of security that may be used. At a first or default level, a signature device can provide security with public key certificates signed by a private key held by the manufacturer of the signature device, and a public verification key, which may be distributed with host computer software. At the default level, the manufacturer is the CA for original certificates on the signature device. At a second level, a user certificate and private key pair is provided as an enhancement to the default level. At the second level, the default-level key pair provided by the manufacturer may be replaced by a second-level key pair that is generated in the signature device. At any level of security, private key parts of the key pairs may be generated and stored in the signature device, which can help to ensure that the key pairs are properly generated and remain secure.

In a TLS link, a device designated as a client typically authenticates a device designated as a server. In some embodiments described herein, a signature device acts as a TLS server and a host computer acts as a TLS client. If authentication of the signature device is desired, the host computer may accept a certificate from the signature device only if it has been signed by a CA. Similarly, if authentication of the host computer by the signature device is desired, the signature device may accept a certificate from a host computer only if it has been signed by a CA. Mutual authentication may include both of these forms of authentication.

Client-side certificates also can be provided. In one illustrative scenario, a command (e.g., a command to generate a key pair) sent to the signature device specifies a requirement for client-side certificates in TLS connections. When the client (e.g., a host PC) passes a certificated key back to the signature device, the signature device can store the root certificate in a certification key chain, which can be used as a verification key to check authenticity of TLS clients that may connect to the signature device. A certificate revocation list (CRL) can be used to specify certificates that are no longer authorized. This can provide protection against unauthorized computers connecting to the signature device.

As used herein, the term "signature device" refers to a device that captures handwriting input for signatures. Signature devices may be implemented as dedicated signature collection devices, such as signature pad devices, or as general purpose devices, such as suitably configured smart phones or tablet computers. Signature devices are not necessarily strictly input devices, and may include other functionality (e.g., display functionality, data transmission functionality, etc.). Further details on illustrative signature devices are provided below.

FIG. 1 is a block diagram of an illustrative system in which described embodiments may be implemented. In the example shown in FIG. 1, a signature device 100 communicates with a host computer 200 via a bi-directional, TLS-protected USB channel. The host computer 200 includes a signature application 205, a signature control instance 210 and related libraries (e.g., signature SDK libraries), and a TLS communication handler 220 that allows the host computer to communicate with the signature device 100 over a TLS channel. Typically, the host computer 200 will also include driver software 230 to facilitate control and communication with the signature device 100. In this example, the TLS channel is provided over a USB connection via USB ports of the host computer 200 and the signature device 100. To facilitate this, the host computer 200 and the signature device 100 may include USB firmware/controller ICs 240 and 140, respectively, to provide USB endpoints for the transmissions. Although FIG. 1 shows a single host computer and signature device for ease of illustration, it should be understood, in the context of this example and other examples described herein, that one or more additional signature devices and host computers may be present, that a host computer may communicate with more than one signature device, and that a signature device may communicate with more than one host computer.

The signature control instance 210 may include a control module (not shown) that controls the signature device 100 and a data module (not shown) that receives signature data from the signature device and may also send image data to the signature device for display. The content of the data handled by the control instance 210 may depend, for example, on the configuration or capabilities of the signature application 205 or the signature device 100. Signature data received from the signature device 100 typically includes pen event data (e.g., coordinate data and pressure data) and may also include other data, such as an image of a signature, biometric data, etc.

In the example shown in FIG. 1, the signature device includes an LCD screen 101 that may display, for example, an electronic document with a signature area in which a signature can be made with a pen device 102. The signature device 100 includes a system control module 110 for general operation of the signature device and a TLS communication handler 120 that allows the signature device to communicate with the host computer 200 over the TLS channel. The system control module 110 controls the signature device 100 and receives sensor data from one or more sensor modules (not shown), which may be included in the signature device 100 or, in some cases, in other devices, such as the pen 102. The sensor data can be translated into pen event data, such as coordinate data and pressure data.

In general, signature devices may use electromagnetic resonance (EMR) technology, in which a digitizer incorporates a sensor board that detects the pen's movement, and energy is induced in the pen's resonant circuit by a magnetic field generated by the sensor board surface. The pen's resonant circuit then makes use of this energy to return a magnetic signal to the sensor board surface. The board detects the pen's coordinate position at regular time intervals even if the electronic pen does not touch the sensor board surface, so long as the pen remains within close enough proximity to the sensor board, such that signals can still be received from the pen. (The effective signal range can vary depending on the particular technology being used, but is generally on the order of several millimeters.)

Alternatively, other handwriting input technology can be used. For example, an electronic pen may use other wireless technology or may be connected by a wire to a digitizer. As another example, an electronic pen may or may not be detectable away from the surface of a digitizer. As another example, an electronic pen may be powered or unpowered. Powered pens may receive power via a wire connected to an external power source or via an on-board battery. As another example, it is possible to input handwriting data without an electronic pen (e.g., via a stylus on a pressure sensitive digital writing pad, a touchscreen, or some other input device that does not require an electronic pen).

However the handwriting data may be collected, handwriting data provided by signature devices may include pen event information, device information, and/or contextual information about the context in which the handwriting was made. Pen event information may include the x/y position of the pen-tip on or above the digitizer surface and the time since the start of the handwriting. In addition to x/y-coordinate values, pen event information may optionally include additional information subject to the capabilities of the signature device, such as pressure (pen force), angles (azimuth, altitude, and/or rotation) and pen-down status. Pen event information is typically collected at regular intervals during a signing process. The sampling rates at which pen event information may be collected may vary depending on system design and configuration.

Returning to the example shown in FIG. 1, the signature device 100 has a bootstrap certificate and key 160 that are hard-coded and contained within a firmware image, and are only used in an initial device setup to set a device certificate and private key 164 and a unique serial number 162 (labeled UID2 in FIG. 1) of the device. As noted above and explained in further detail below, the device certificate is installed (e.g., at a factory) before the signature device 100 is put into use.

As noted above and explained in further detail below, depending on the level of security desired and the design of the overall system, the signature device 100 also may store a user certificate and private key 166—a key pair that is created on the signature device and signed by the end user's CA. For client-side certificates, the signature device 100 also may store a client-side CRL (certificate revocation list) 168 to specify certificates that are no longer authorized. This can provide protection against unauthorized computers connecting to the signature device 100. Although the signature device 100 may include more than one certificate, only one can be used at a time. In this example, the user certificate 166 will be used if present. Otherwise, the device certificate 164 will be used. As noted above, the bootstrap certificate 160 is only used in an initial device setup to set the device certificate 164 and ID 162.

Figure 2:
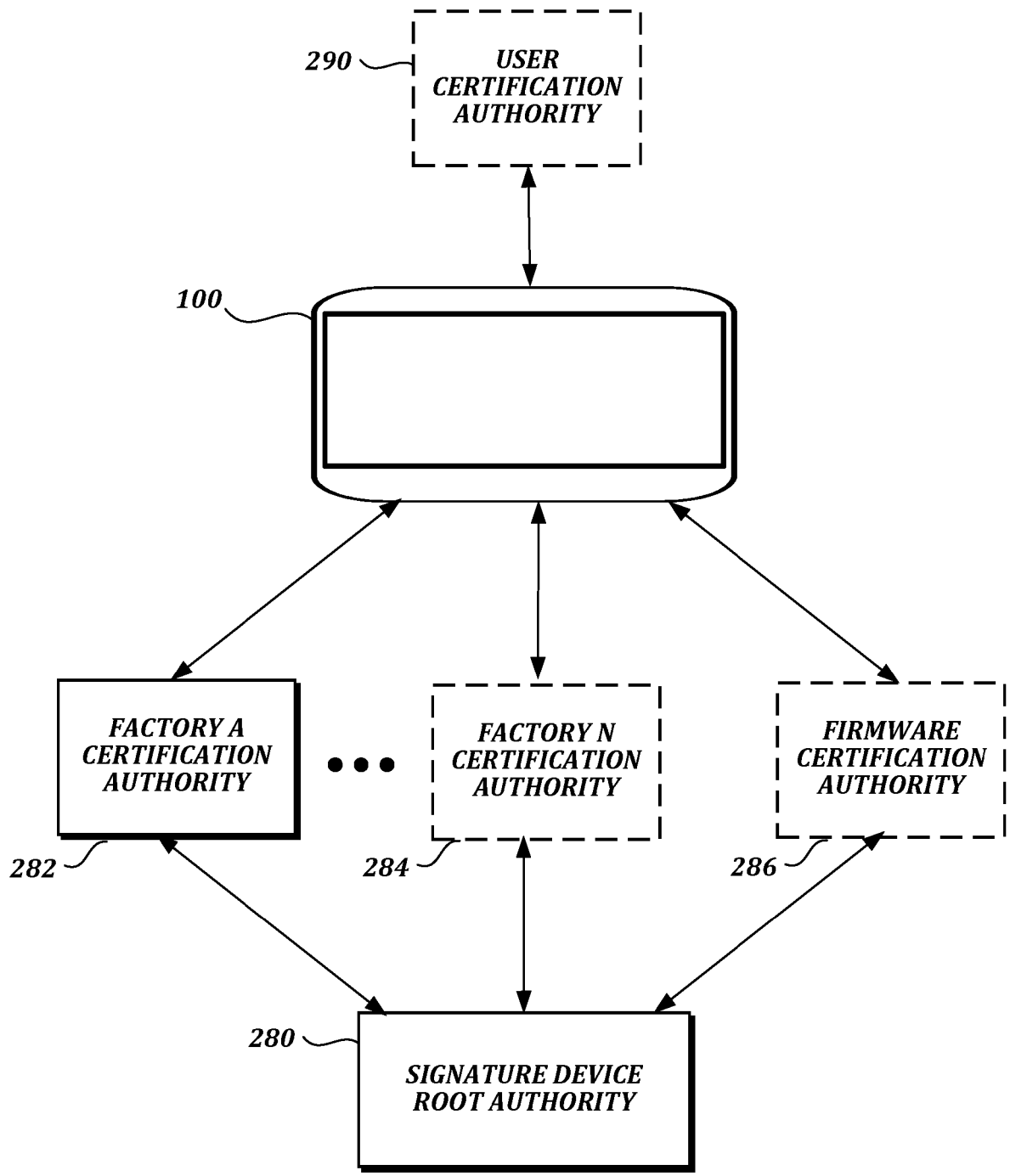
FIG. 2 is a block diagram of an illustrative hierarchy of certificate authorities that may be used in described embodiments.

FIG. 2 is a block diagram of an illustrative hierarchy of CAs. The illustrative CAs shown in FIG. 2 may be used to provide the device certificate 164 and user certificate 166 shown in FIG. 1, as well as a firmware certificate (not shown in FIG. 1), which can be useful in scenarios where firmware must be digitally signed in order for a signature device to accept a firmware update. In the example shown in FIG. 2, a signature device root authority 280 facilitates provision of one or more factory CAs 282, 284 for one or more individual factories and a firmware CA 286. Providing separate CAs for individual factories helps to isolate the potential risk of a third-party factory causing a security issue. Signature devices that have been initialized by that factory can then also be isolated.

FIG. 2 also shows a user CA 290. As noted above and explained in further detail below, a user certificate and private key pair may be provided as an enhancement to a default level of security, in which a default-level key pair provided by the manufacturer may be replaced by a user certificate and private key pair. In the context of generating user certificates, it should be understood that the term "user" or "end user" of a signature device may refer to any owner of the device (e.g., a bank or other business or organization), or any authorized person or entity that selects a CA for the user certificate, and need not refer to a person that only uses the device to make a signature, such as a customer in a bank.

II. ILLUSTRATIVE EMBODIMENTS

A. First Illustrative Embodiment

In this section, a first illustrative embodiment is described in which a device certificate (a public key certificate signed by a private key held by, e.g., the manufacturer of the signature device) is installed in a signature device before the signature device is put into use.

Figure 3A:
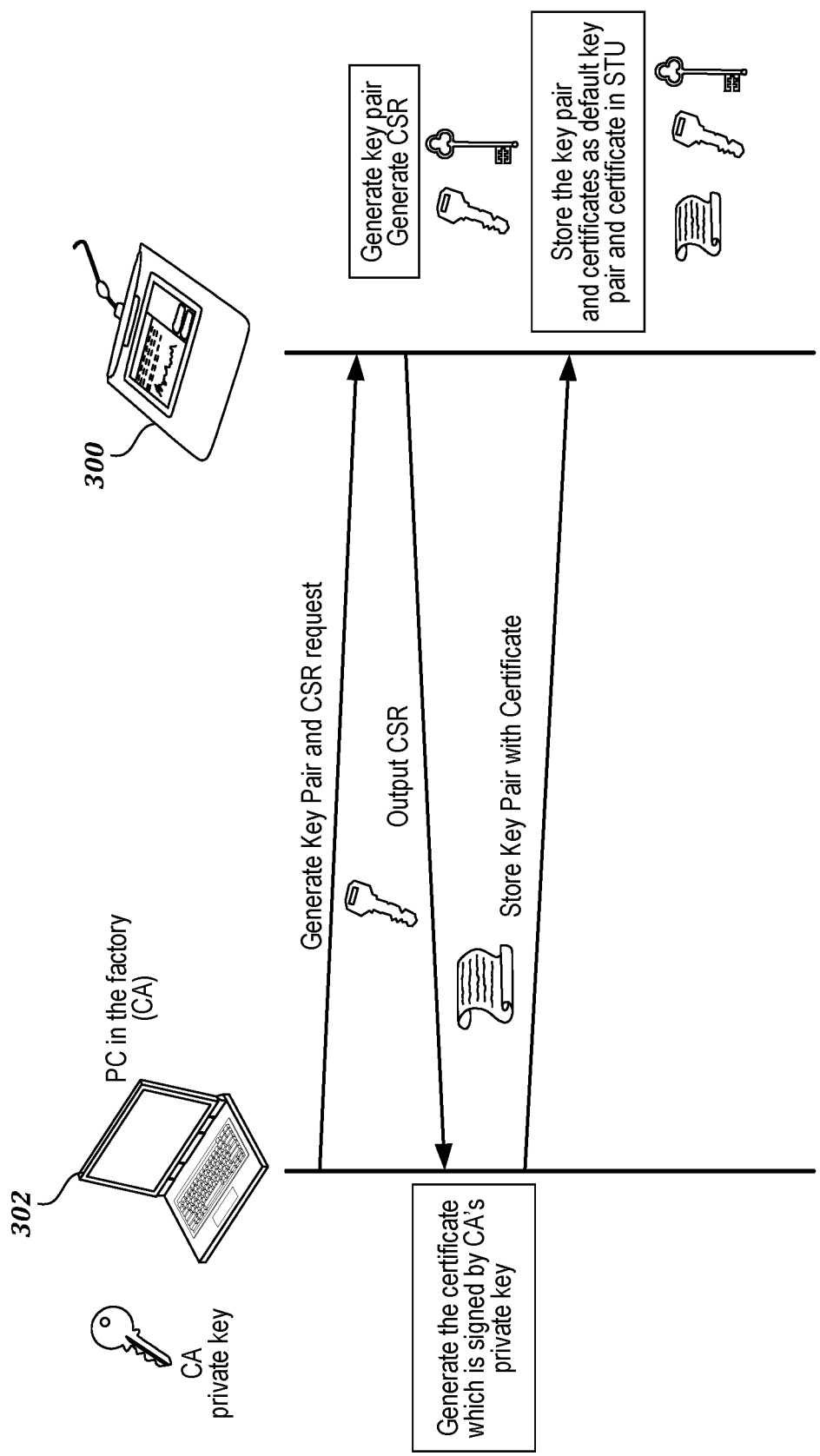
FIGS. 3A and 3B are flow diagrams of processes according to a first illustrative embodiment.

FIG. 3A is a flow diagram of an illustrative process for installation of a device certificate in a signature device, such as a signature tablet 300 (abbreviated as "STU" in FIG. 3A). In the example shown in FIG. 3A, the tablet 300 communicates with a host computer 302 at a factory. The host computer 302 requests the tablet 300 to generate a new device key pair and a certificate signing request (CSR). The tablet 300 generates the new key pair and the CSR, and sends the CSR to the host computer 300. The host computer 302 generates a certificate signed by the CA's private key, and returns the certificate to the tablet 300. The tablet 300 stores the device certificate and the device key pair.

Figure 3B:
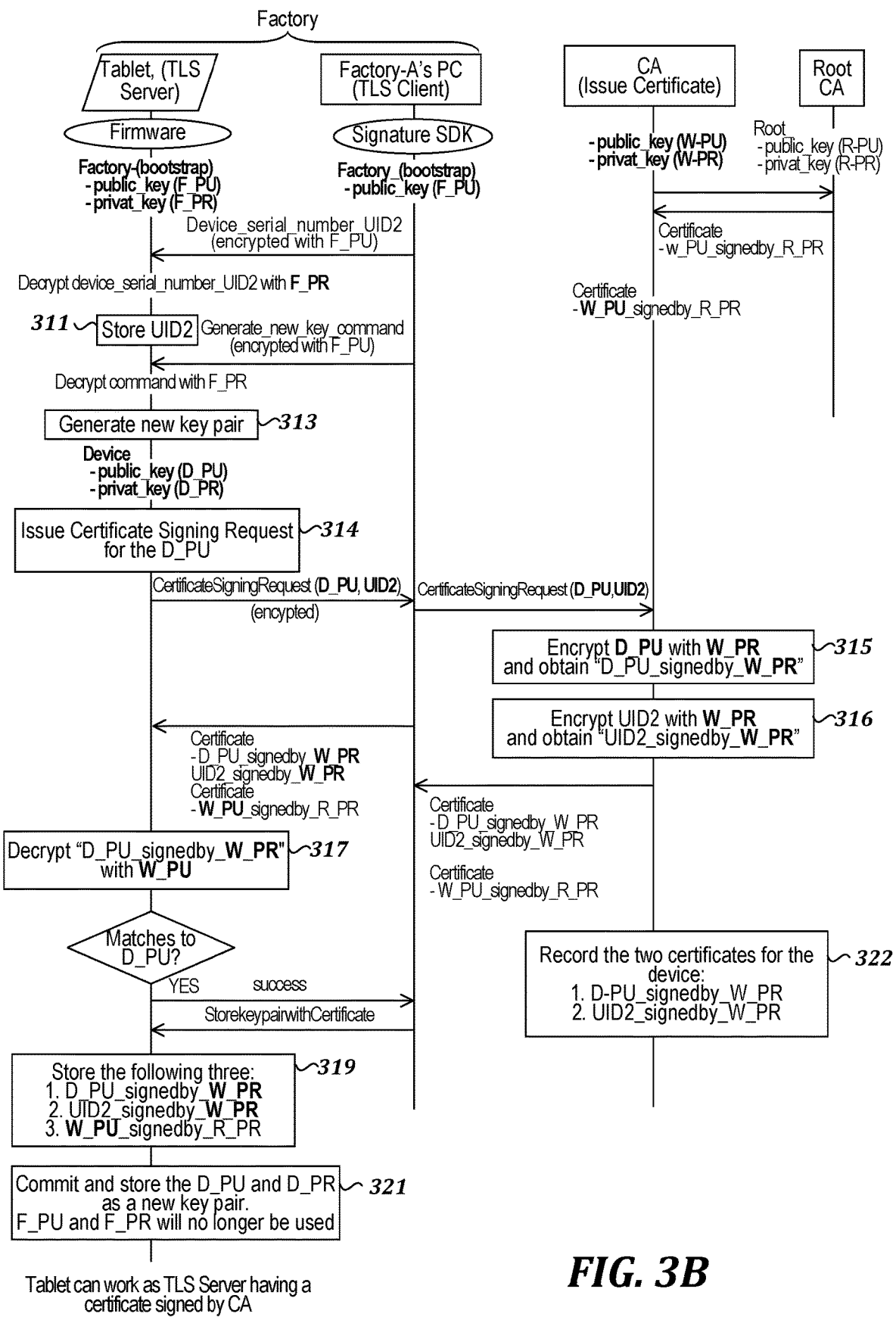

FIG. 3B is a flow diagram of another illustrative process for installation of a device certificate in a signature device, such as the signature tablet 100 shown in FIG. 1. In the example shown in FIG. 3B, the tablet communicates with a host computer at Factory A. A bootstrap certificate and key contained within a firmware image of the tablet are used to obtain an encrypted unique serial number (UID2) of the device from the factory host computer, acting as a TLS client. The factory host computer also sends an encrypted "new key" command to generate a new key pair. The tablet decrypts the device serial number using its bootstrap private key (F_PR) and stores the device serial number in the tablet (step 311). The tablet also decrypts the new key command and generates a new key pair (step 313) consisting of a device public key (D_PU) and a device private key (D_PR).

At step 314, the tablet issues a certificate signing request (CSR) for the device public key and sends this CSR to the factory host computer, which forwards it to the factory CA. (Separately, as shown in FIG. 3, the factory CA has previously generated its own public key (W_PU) and private key (W_PR), with the public key signed by a root authority.) The CSR includes the device public key and the device serial number. At step 315, the factory CA encrypts the device public key with the CA private key (W_PR) and provides the CA's digital signature for the device public key. At step 316, the factory CA encrypts the device serial number with the CA private key (W_PR) and provides the CA's digital signature for the device serial number. The factory CA then returns a certificate with the signed device public key (D_PU) and device serial number (UID2) to the tablet, along with a certificate with the CA's signed public key (W_PU).

At step 317, the tablet decrypts the signed device public key (D_PU) with the CA's signed public key (W_PU). If the decrypted device public key matches the version that was already on the tablet, the tablet returns a success notification to the factory host computer, which sends a command to store the device key pair with a device certificate indicating the appropriate signatures of the device public key, the device serial number, and the factory public key. At step 319, the tablet stores the device certificate and at step 321, the tablet stores the device key pair, while the two certificates for the device are recorded by the CA at step 322.

In this state, the tablet can operate as a TLS server when communicating with a user's host computer (e.g., a bank's host computer) acting as a TLS client.

B. Second Illustrative Embodiment

In this section, a second illustrative embodiment is described in which a signature device establishes TLS communication with a user's host computer (e.g., a bank's host computer) via a USB connection.

Figure 4A:
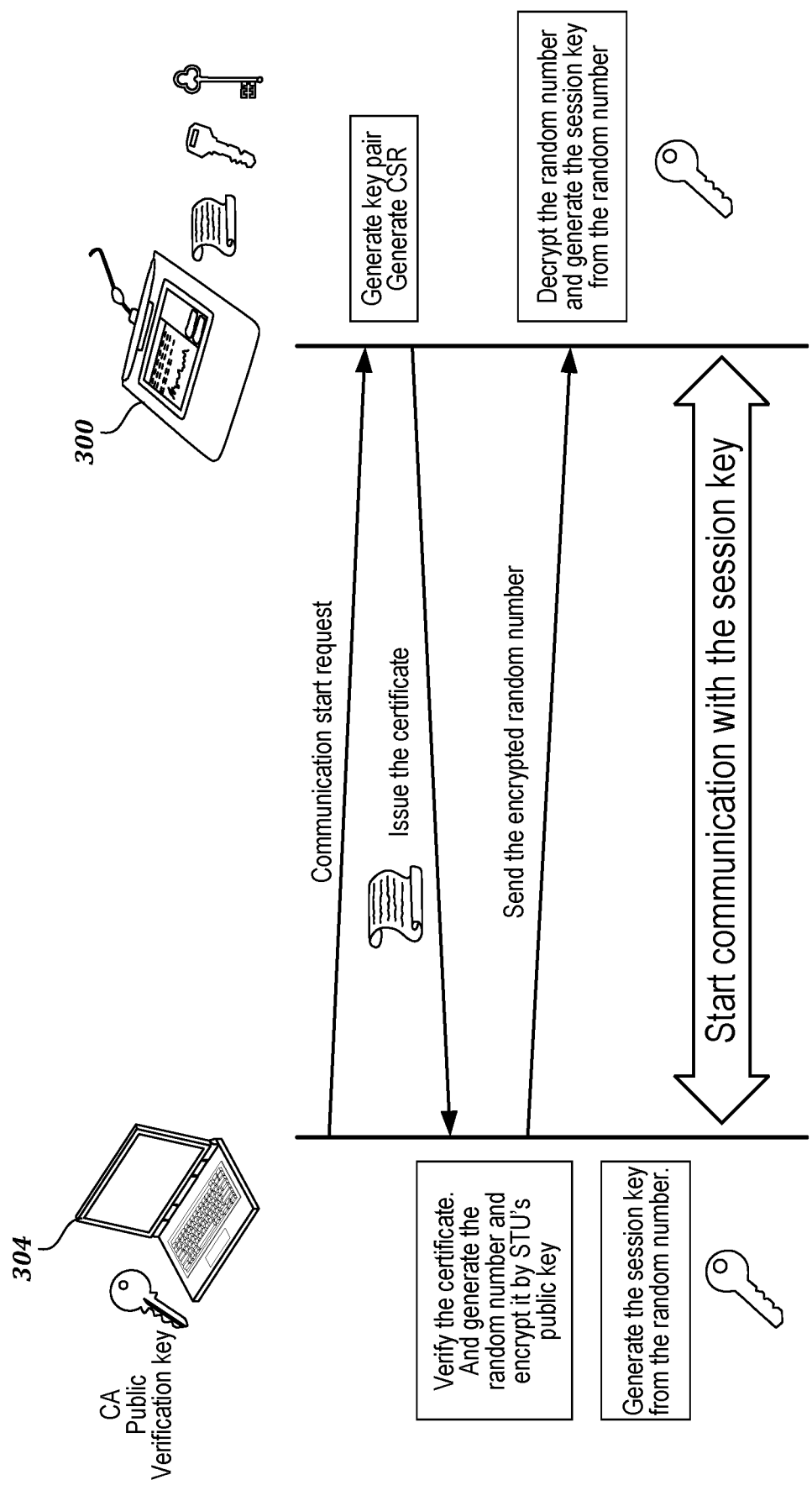
FIGS. 4A and 4B are flow diagrams of processes according to a second illustrative embodiment.

FIG. 4A is a flow diagram of an illustrative process in which a signature device, such as a signature tablet 300 (abbreviated as "STU" in FIG. 4A) establishes communication with a user's host computer 304 (e.g., a bank's host computer). In the example shown in FIG. 4A, the tablet 300 is connected to the user's host computer 304, and the host computer requests the tablet 300 to generate a new device key pair and a certificate signing request (CSR). The tablet 300 generates the new key pair and the CSR, and sends a certificate to the host computer 304. The host computer 304 verifies the certificate, generates a random number, generates a session key from the random number, encrypts the random number with the tablet's public key, and sends the encrypted random number to the tablet 300. The tablet 300 decrypts the random number and generates a session key from the random number.

Figure 4B:
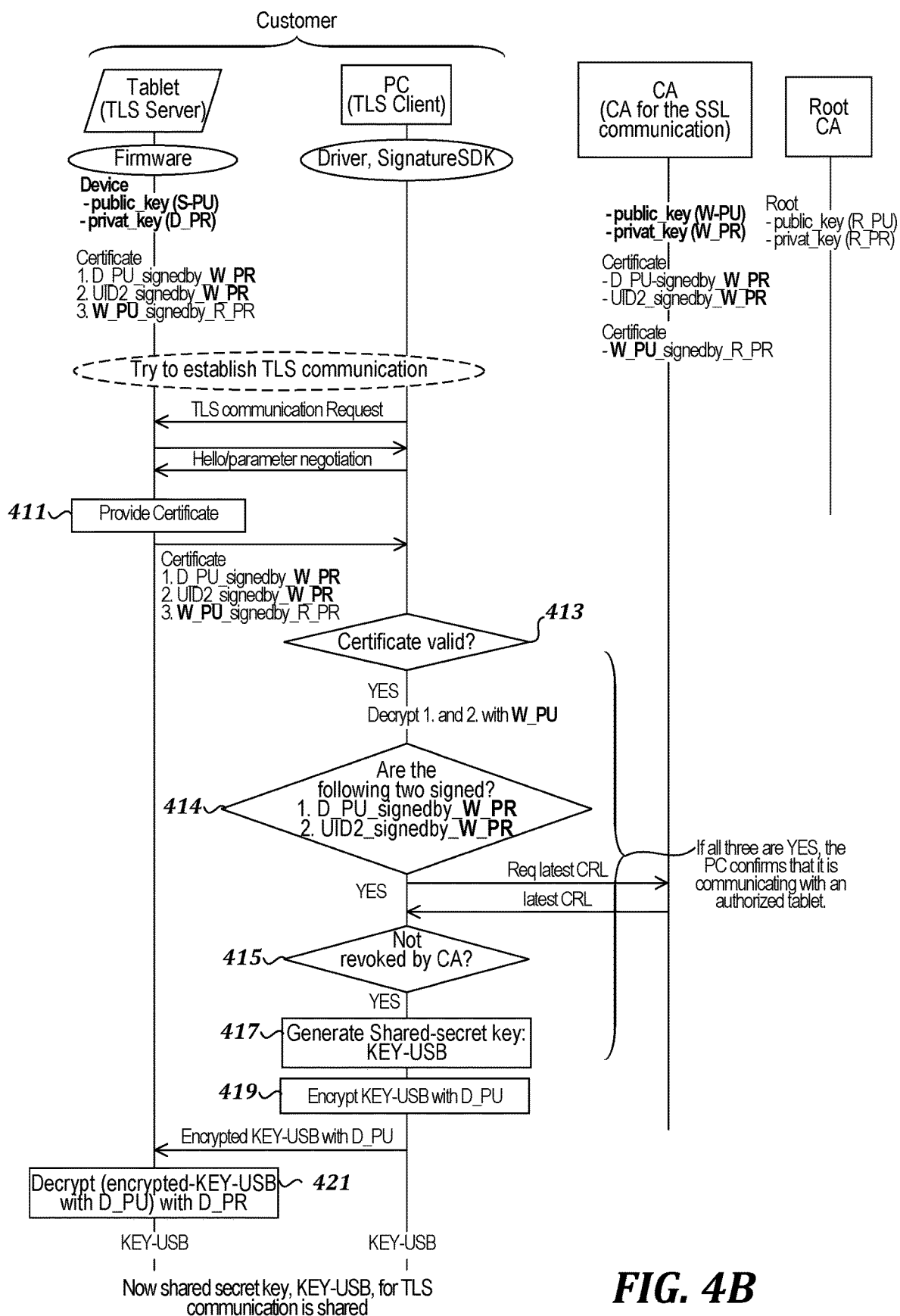

FIG. 4B is a flow diagram of another illustrative process in which a signature device (e.g., the signature tablet 100 shown in FIG. 1) establishes communication with a user's host computer (e.g., a bank's host computer). In the example shown in FIG. 4B, a tablet stores a device key pair consisting of a device public key (D_PU) and a device private key (D_PR) with a device certificate indicating the appropriate signatures of the device public key (D_PU), a device serial number (UID2), and a factory CA public key (W_PU).

The tablet is connected to the user's host computer, and the host computer requests TLS communication. Responsive to this request, parameters for the TLS communication may be negotiated. At step 411, the tablet provides the device certificate. The host computer then runs several checks to confirm that it is communicating with an authorized tablet. At step 413, the host computer determines whether the certificate is valid. If it is valid, at step 414 the host computer decrypts information in the device certificate and determines whether the device public key (D_PU) and the device serial number (UID2) have been signed by the factory CA's private key (W_PR). If so, at step 415 the host computer confirms that the device certificate has not been revoked by the factory CA. As mentioned above, a certificate revocation list (CRL) can be used to specify certificates that are no longer authorized. In the example shown in FIG. 4B, the host computer requests an updated CRL from the factory CA and checks that the device certificate is still authorized.

Once the host computer confirms that the device certificate has not been revoked by the factory CA, the host computer generates a shared secret key (KEY-USB) at step 417 and encrypts it using the device public key (D_PU) at step 419. The host computer then sends the encrypted shared secret key (KEY-USB) to the tablet, which decrypts it using the device private key (D_PR) at step 421. The shared secret key can then be used for secure TLS communication.

C. Third Illustrative Embodiment

In this section, a third illustrative embodiment is described in which a signature device transmits pen event data using TLS communication to a user's host computer (e.g., a bank's host computer) via a USB connection.

Figure 4C:
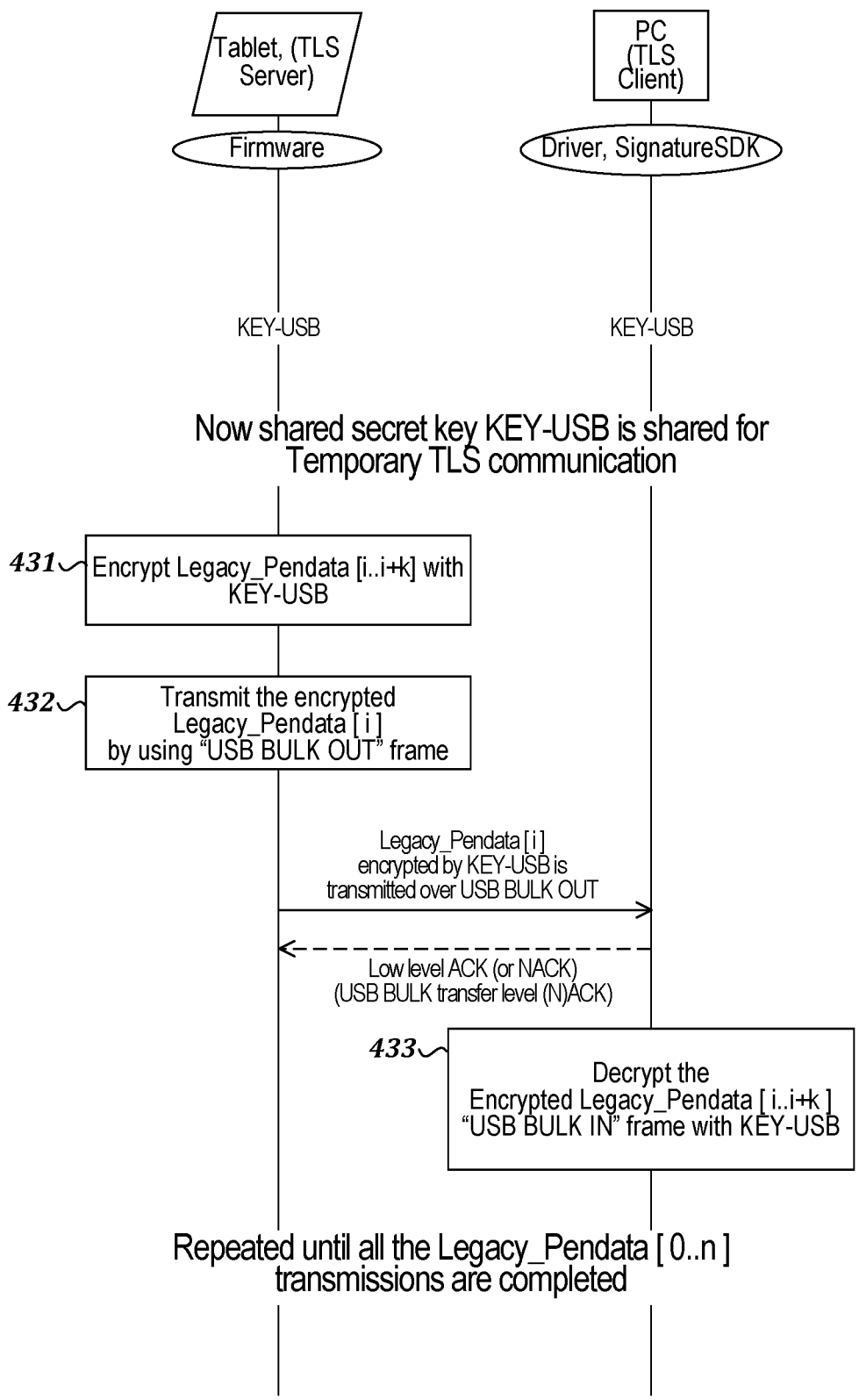
FIG. 4C is a flow diagram of a process according to a third illustrative embodiment.

FIG. 4C is a flow diagram of an illustrative process in which a signature device (e.g., the signature tablet 100 shown in FIG. 1) acting as a TLS server transmits pen event data to a user's host computer (e.g., a bank's host computer) acting as a TLS client, using the shared secret key described with reference to FIG. 4B. In the example shown in FIG. 4C, the USB bulk transfer mechanism is used for the purpose of transmitting pen event data. The tablet and the host computer each store the shared secret key (KEY-USB) for secure TLS communication. At step 431, the tablet encrypts pen data with the shared secret key (KEY-USB). At step 432, the tablet sends the encrypted pen data via a USB bulk OUT endpoint. The host computer can return an acknowledgement via a USB bulk transfer mechanism, as well. At step 433, the host computer receives the encrypted pen data via a USB bulk IN endpoint and decrypts the encrypted pen data using the shared secret key (KEY-USB). These steps can be repeated until pen data transmissions are completed.

D. Fourth Illustrative Embodiment

As noted above, a user certificate and key pair may be provided as an enhancement to a default level of security (e.g., device certificates, as described above), in which a default-level key pair provided by the manufacturer may be replaced by a user certificate and key pair. This replacement can be carried out by connecting the signature device to a host computer using default-level protection, and then generating a new key pair and requesting a corresponding certificate. As noted above, it should be understood that the term "user" or "end user" may refer to any owner of the signature device (e.g., a bank or other business or organization), or any authorized person or entity that selects a CA for the user certificate, and need not refer to a person that only uses the device to make a signature, such as a customer in a bank.

In this section, a fourth illustrative embodiment is described in which a user certificate is installed in a signature device to replace the device certificate. In an illustrative scenario, the user's host computer sends a command to the signature device to generate a user key pair. The signature device generates the user key pair and returns a CSR for the new public key to the host computer. The host computer may then send the CSR to a second CA (the user CA) selected by the end user. The host computer obtains a certificate for the new public key from the user CA and forwards the certificate to the signature device. The signature device stores the new certificate with the user key pair. The device key pair is made unavailable, although it may be reinstated in some situations, such as a factory reset to restore original device configurations.

Figure 5:
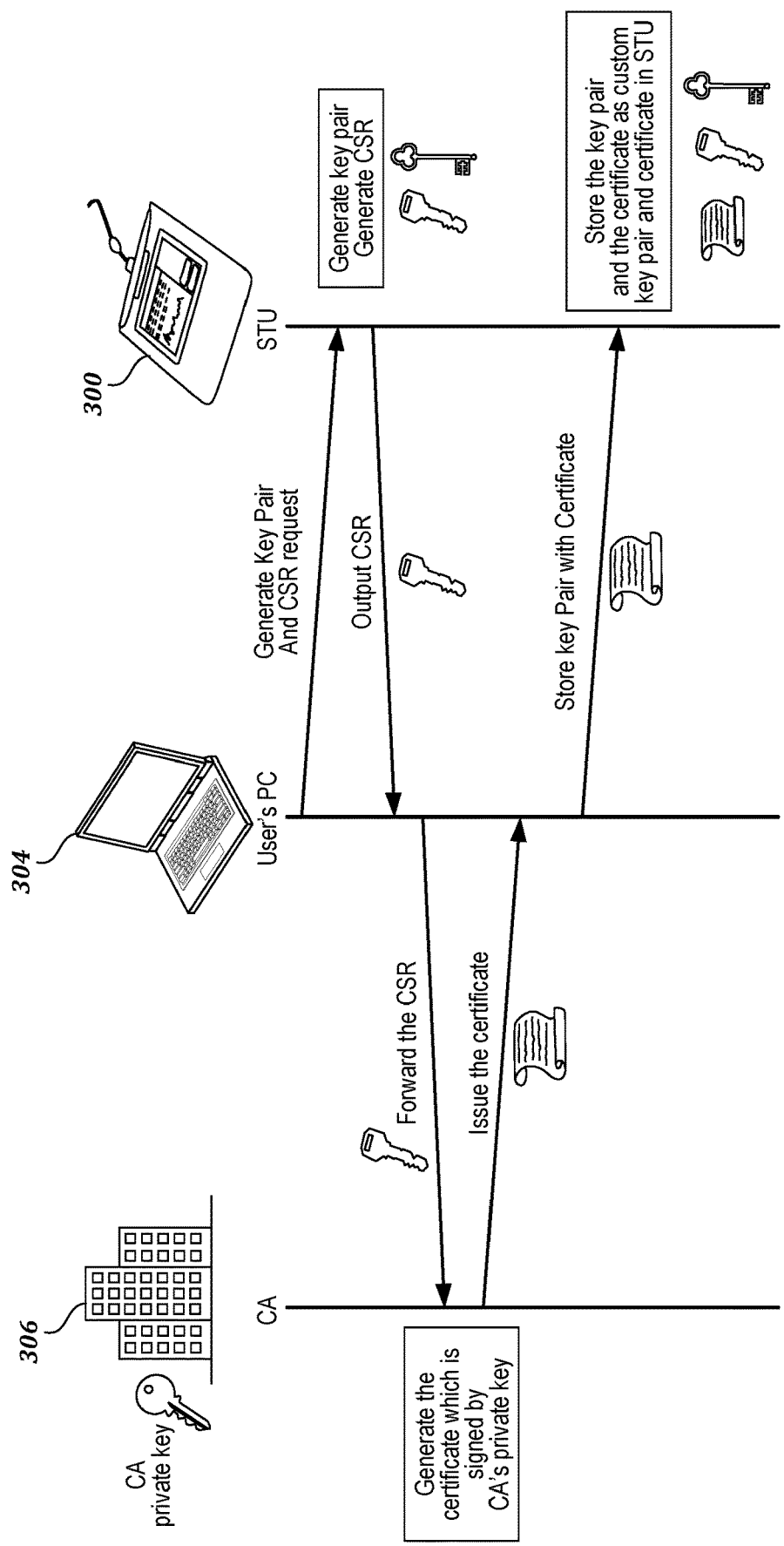
FIGS. 5 and 6 are flow diagrams of processes according to a fourth illustrative embodiment.

FIG. 5 is a flow diagram of an illustrative process in which a signature device (e.g., the signature tablet 300, abbreviated as "STU" in FIG. 5) communicates with a user's host computer 304 (e.g., a bank's host computer) and creates a custom user key pair. In the example shown in FIG. 5, the tablet 300 is connected to the user's host computer 304, and the host computer requests the tablet 300 to generate a new device key pair and a certificate signing request (CSR). The tablet 300 generates the new key pair and the CSR, and sends the CSR to the host computer 304, which forwards the CSR to a CA 306. The CA 306 generates a certificate signed by the CA's private key, and returns the certificate to the host computer 304, which forwards the certificate to the tablet 300. The tablet 300 stores the certificate and the custom user key pair.

A user certificate also may be obtained in a process that is similar to the more detailed process shown in FIG. 3B for obtaining the device certificate. In such a scenario, once the user key pair is generated, the tablet issues a CSR for the user public key and sends this CSR to the user's host computer, which forwards it to the user's CA. The CA encrypts the user public key with the CA's private key and provides the CA's digital signature for the user public key. The CA then returns a certificate with the signed user public key to the tablet, along with a certificate with the CA's signed public key. The tablet decrypts the signed user public key with the CA's signed public key. If the decrypted user public key matches the version that was already on the tablet, the tablet returns a success notification to the user's host computer, which sends a command to store the user key pair with a user certificate having the appropriate signatures. The tablet then stores the user certificate and the user key pair for future use, and the device key pair and certificate are made unavailable.

In this illustrative embodiment, a shared secret key for TLS communication may be obtained in a process similar to the process shown in FIG. 4B. For example, the tablet can provide the user certificate to the host computer, and the host computer can determine whether the user certificate is valid, check for appropriate digital signatures by the CA, and confirm that the user certificate has not been revoked by the CA. Once that is confirmed, the host computer can generate a shared secret key and encrypt it using the user public key. The host computer can then send the encrypted shared secret key to the tablet, which can decrypt it using the user private key. The shared secret key can then be used for secure TLS communication. Once TLS communication is established between the signature device and the host computer, the signature device can then securely transmit data to the host computer via a USB connection, using a process similar to the process shown in FIG. 4C.

Figure 6:
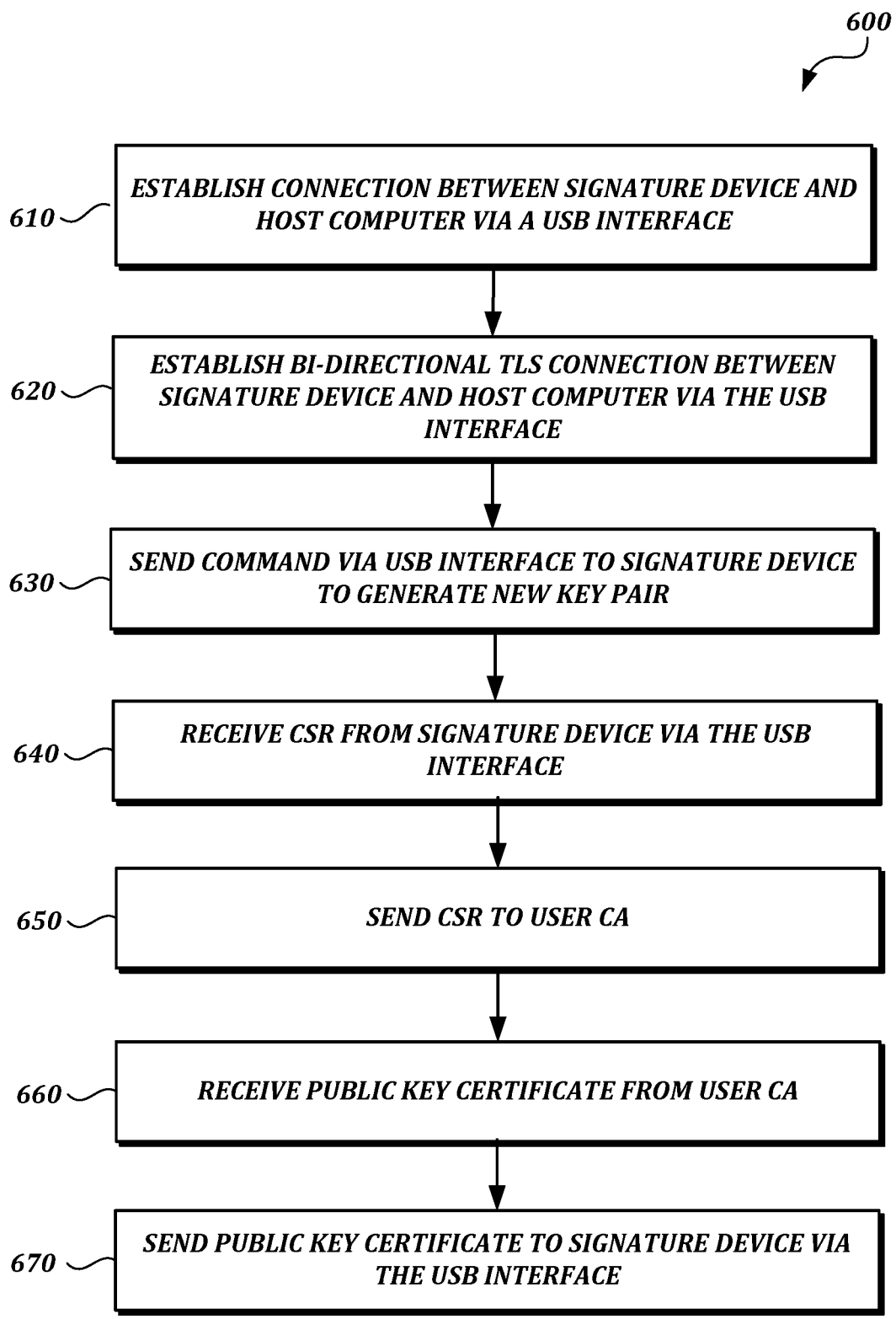

FIG. 6 is a flow chart of an illustrative process 600 that may be performed according to the fourth illustrative embodiment. In the example shown in FIG. 6, at step 610 a connection is established between a signature device and a host computer via an interface, such as a USB interface. At step 620, a TLS connection is established between the signature device and the host computer via the interface. This is facilitated by a device certificate and key pair on the signature device that allows the TLS connection to be established for temporary communication, before a user certificate and key pair are obtained. At step 630, the host computer sends a command to the signature device via the interface to generate a new key pair. At step 640, after the new key pair is generated by the signature device, the host computer receives a CSR from the signature device via the interface. The CSR includes the new public key. At step 650, the host computer sends the CSR to a third-party CA selected by the user. At step 660, the host computer receives a new public key certificate from the CA. At step 670, the host computer sends the new public key certificate to the signature device via the interface. At this point, new TLS connections can be established between the signature device and the host computer (or other host computers) using the user certificate and key pair. These new TLS connections can be used to send encrypted pen data, or other data, over connections that have an additional level of trust, provided by the user's CA.

E. Fifth Illustrative Embodiment

In this section, a fifth illustrative embodiment is described in which a signature device transmits data using TLS communication to a user's host computer (e.g., a bank's host computer) via a USB connection.

Figure 7:
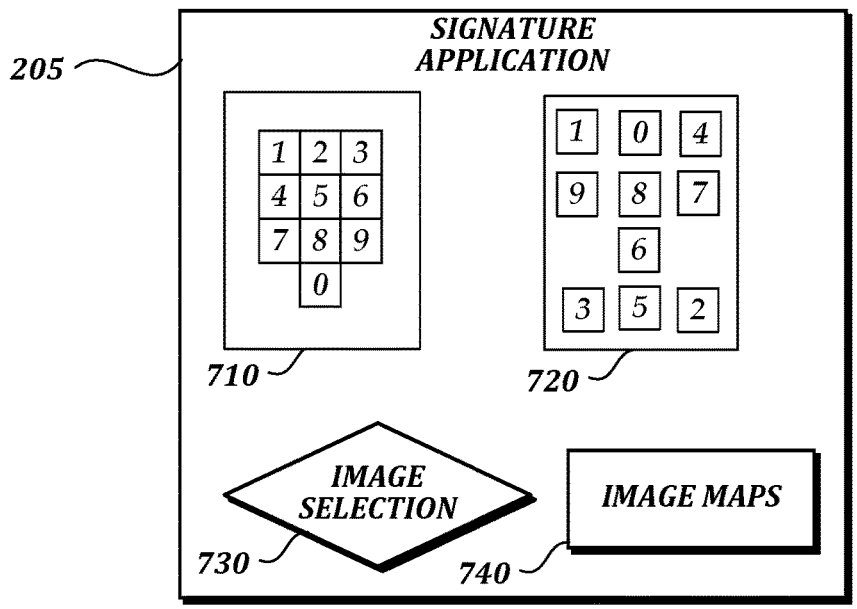
FIG. 7 is a block diagram of a system in which a fifth illustrative embodiment may be implemented.
Figure 7:
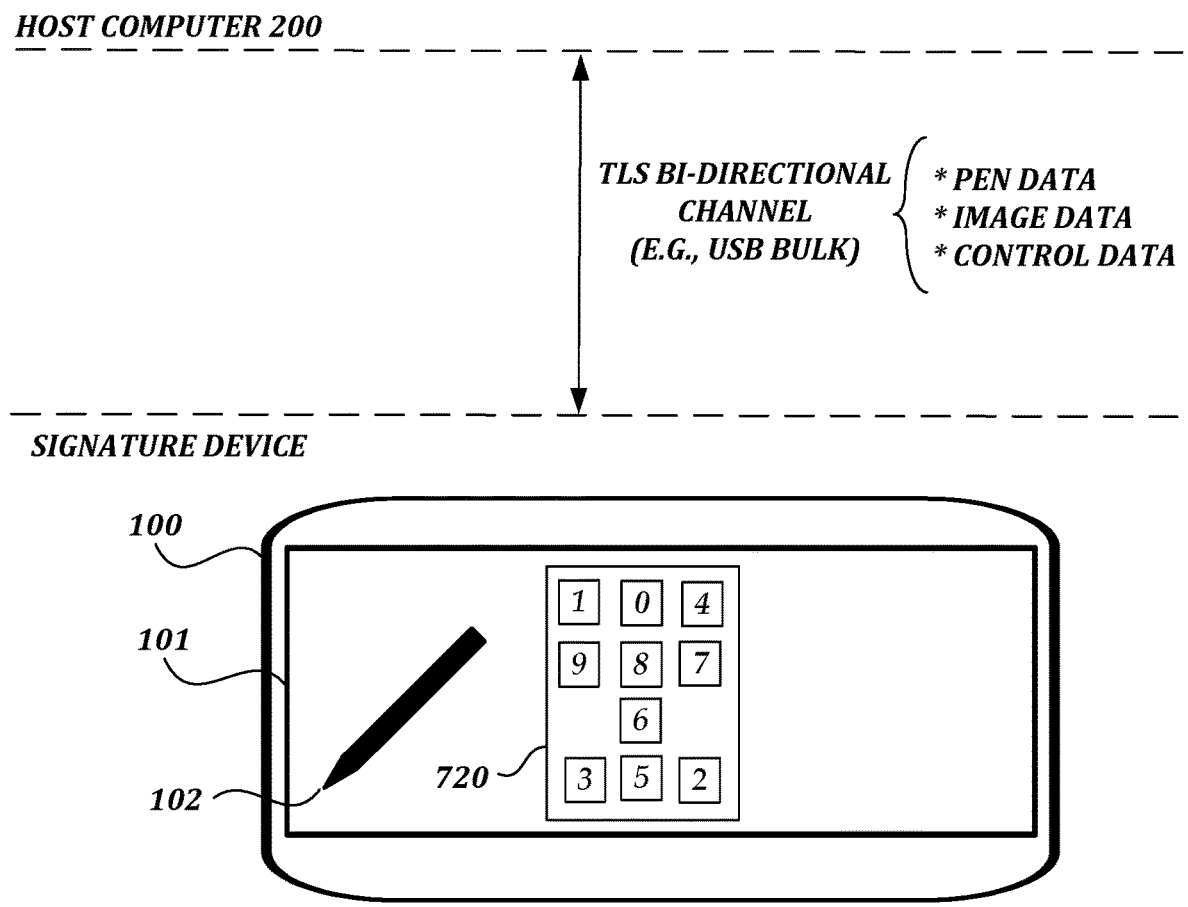

FIG. 7 is a block diagram of an illustrative system in which the fifth illustrative embodiment may be implemented. As shown in FIG. 7, a signature device 100 communicates with a host computer 200 via a bi-directional, TLS-protected USB channel. The signature device 100 and the host computer 200 include components similar to those shown in FIG. 1, but many of these components are not shown in FIG. 7 for ease of illustration. In the example shown in FIG. 7, the host computer 200 includes a signature application 205 with multiple images 710, 720 of a PIN pad, image selection functionality 730, and image maps 740 that map particular characters in the PIN pad with particular regions of each image 710, 720.

Image 710 represents a first configuration of a PIN pad, and image 720 represents a scrambled configuration of the PIN pad. The possibility of multiple PIN pad configurations means that if pen position data is intercepted during transmission, the pen position data cannot be easily mapped to a particular character on the PIN pad, without knowing which image was used. Although only two images are shown for ease of illustration, it should be understood that more images can be easily accommodated, and that additional scrambled PIN pad layouts may be preferable to provide additional security.

The image selection functionality 730 selects image 720 for display on the signature device 100. The host computer 200 then encrypts and sends the selected image 720 to the signature device 100 for display. The signature device 100 decrypts and displays the image 720. A user (e.g., a bank customer) can then enter a PIN by touching the areas of the image corresponding to the desired characters, generating pen data. This pen data can then be encrypted and sent back to the signature device, for decryption and mapping to particular characters of the PIN based on the image maps 740. Other software on the host computer (perhaps in combination with other computers, such as banking information servers) can then be used to determine whether the PIN entered by the user is valid or not.

Figure 8:
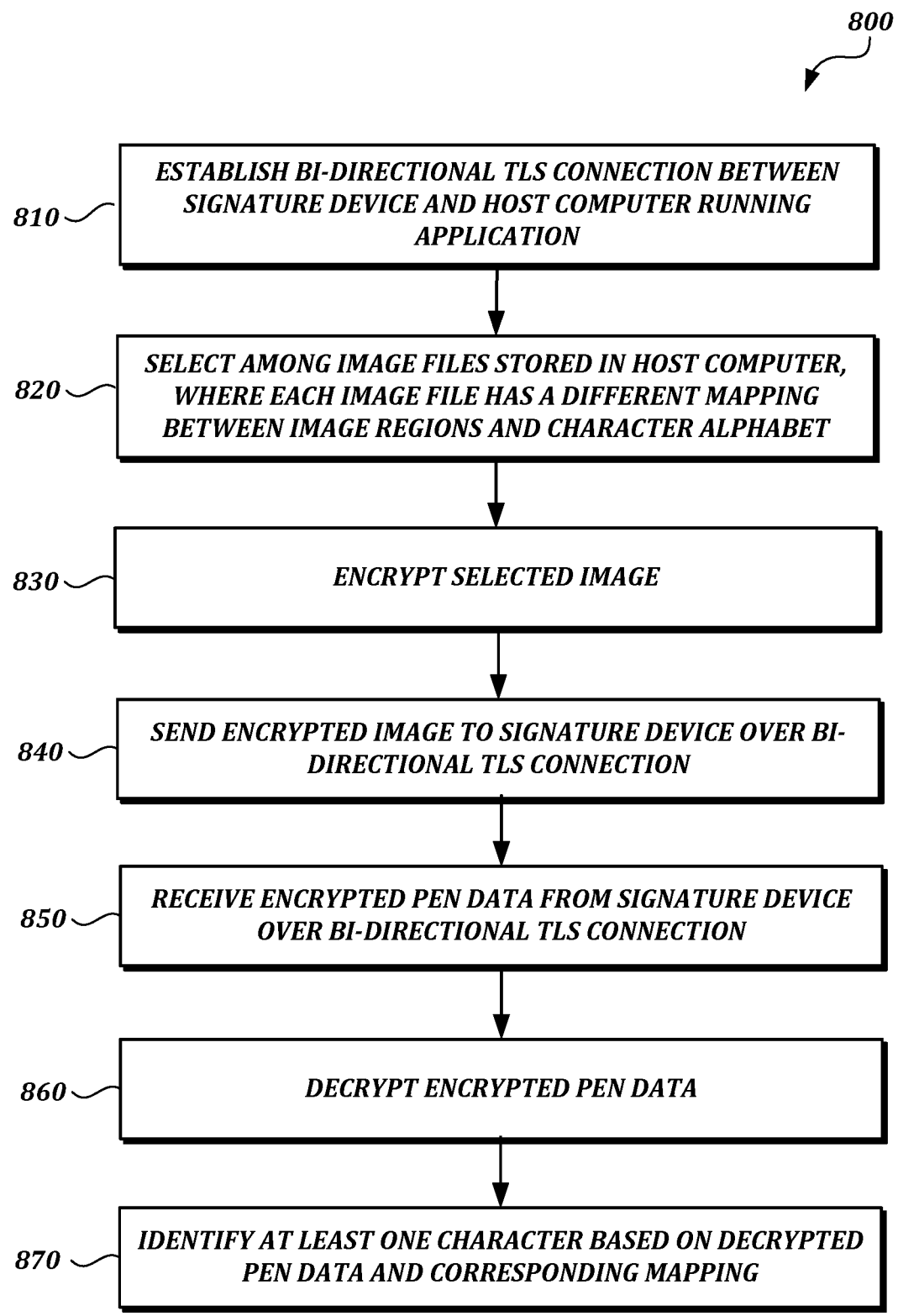
FIG. 8 is a flow chart of a process that may be performed according to a fifth illustrative embodiment.

FIG. 8 is a flow chart of an illustrative process 800 that may be performed according to the fifth illustrative embodiment. In the example shown in FIG. 8, at step 810 a TLS connection is established between a signature device and a host computer running an application. For example, if the signature device and the host computer are connected via a USB interface, the TLS connection may be established via the USB interface. At step 820, the host computer selects an image file from among a set of image files stored in the host computer. Each image file has a different mapping between image regions and a character alphabet. In at least one embodiment, each image file in the set of image files represents a different layout of characters for entering a PIN (e.g., for accessing a bank account). At step 830, the host computer encrypts the selected image. At step 840, the host computer sends the encrypted image to the signature device over the TLS connection. At step 850, the host computer receives encrypted pen data from the signature device over the TLS connection. At step 860, the host computer decrypts the encrypted pen data. At step 870, the host computer identifies at least one character based on the decrypted pen data and the mapping between image regions and the character alphabet associated with the select image file.

F. Sixth Illustrative Embodiment

In this section, a sixth illustrative embodiment is described in which a signature tablet is used in combination with an external computer (e.g., a bank's host computer). The signature tablet may act as a TLS server having a server certificate.

Figure 9:
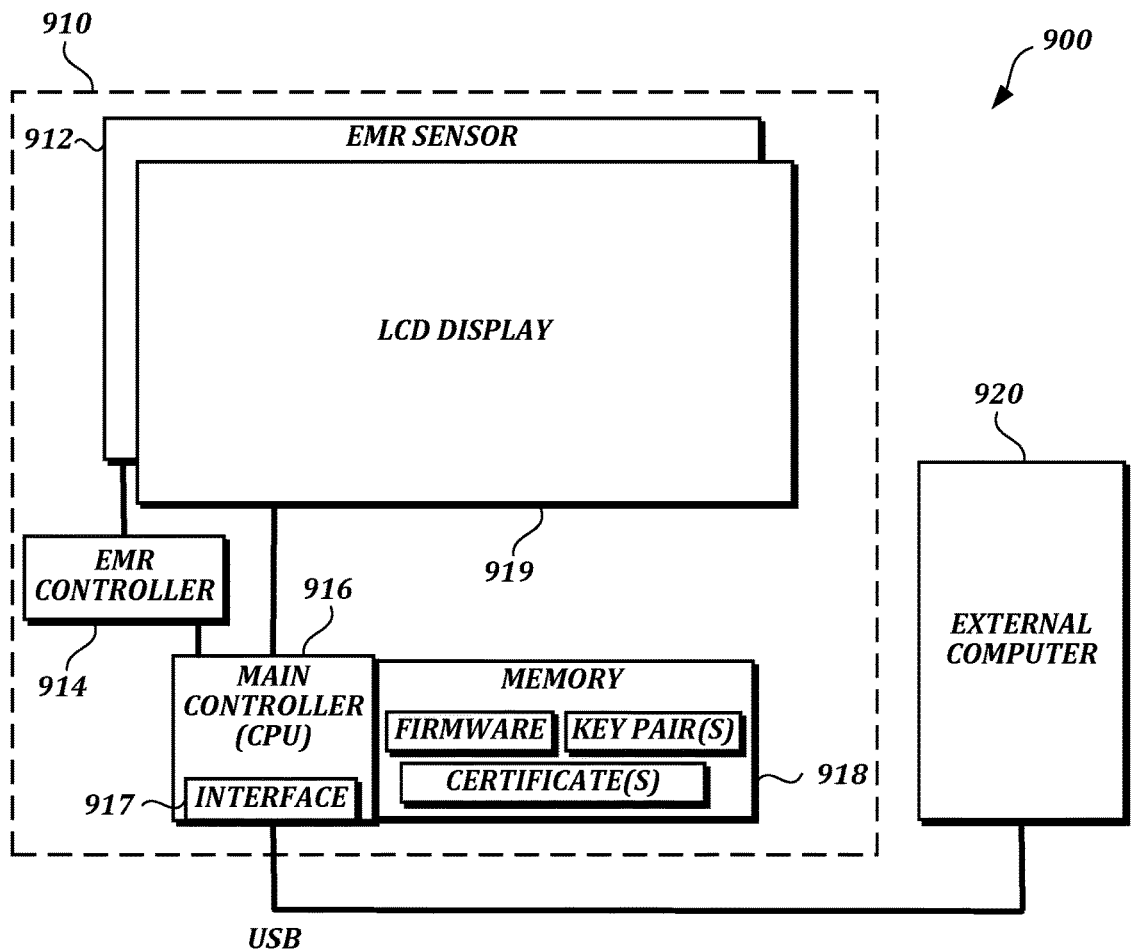
FIG. 9 is a block diagram of an illustrative system according to a sixth embodiment.

FIG. 9 is a block diagram of an illustrative system 900 according to the sixth embodiment. In the example shown in FIG. 9, a signature tablet 910 communicates with an external computer 920. The signature tablet comprises an input sensor 912 (e.g., an EMR sensor), an input sensor controller 914 (e.g., an EMR controller), and a main controller 916. The main controller comprises a peripheral device interface 917 (e.g., a USB interface) and memory 918. The signature tablet also may include a display 919 (e.g., an LCD display).

In this illustrative embodiment, the input sensor controller is configured to detect a series of positions of a pen and generate a series of pen data. The memory 918 stores a key pair of a public key and a private key, a server certificate for the public key, and firmware. The firmware is configured to cause the main controller 916 to establish a connection with the external computer 920 over the peripheral device interface 917 when the peripheral device interface is detected to be connected with the external computer 920; provide the server certificate including the public key to the external computer 920 over the connection; and, in a case where a response indicating the server certificate is trusted by the external computer is received, send the series of pen data to the external computer 920. The external computer 920 may be programmed to receive the server certificate including the public key over the connection, determine whether the server certificate is trusted or not, send the response indicating the server certificate is trusted to the signature tablet 910 in a case where the server certificate is trusted, and receive the series of pen data.

The firmware may be further configured to cause the main controller 916 to receive an encrypted shared secret key generated by the external computer 920 over the connection (e.g., via a secure TLS or SSL session established directly via the connection over the USB peripheral device interface) as the response indicating the server certificate is trusted by the external computer; and send the series of pen data by encrypting the series of pen data with the shared secret key. The firmware may be further configured to cause the main controller 916 to establish a default pipe for exchanging USB device properties and two pipes for USB bulk transfer for two-way communication with the external computer 920 over the peripheral device interface 917. The series of pen data may be sent over the TLS session established via the two pipes for USB bulk transfer.

The signature tablet 910 may issue a certificate signing request (CSR). For example, the firmware may be further configured to cause the main controller 916 to generate a first key pair in response to a command, send a CSR for the public key in order to obtain the server certificate signed by a certificate authority (CA), and store the server certificate including the public key in the memory 918. The firmware may be further configured to cause the main controller 916 to generate a new key pair of a new public key and a new private key in response to another command, send a CSR for the new public key in order to obtain the public key signed by a second CA, and update the memory 918 to store the new key pair and a server certificate for the new public key signed by the second CA.

For mutual authentication, the firmware may be further configured to cause the main controller 916 to retrieve a client certificate including a public key of the external computer 920 from the external computer 920, determine whether the client certificate is trusted or not, and, in case the client certificate is trusted and the response indicating that the server certificate is trusted by the external computer 920 is received, send the series of pen data to the external computer 920.

For PIN entry, the firmware may be further configured to cause the signature tablet 910 to decrypt encrypted image data sent from the external computer 920 over the connection to obtain image data, and display a path of the positions of the pen in a manner such that the path is overlaid with the image data when displayed on the display 919. The image data may represent either a first image for entering a handwriting signature or a second image showing a layout of characters for entering a PIN. The firmware may be further configured to cause the signature tablet to display the path of the positions of the pen in a manner such that the path is overlaid with the first image, and display a character selected by the positions in a highlighted manner.

III. COMPUTING ENVIRONMENT

Unless otherwise specified in the context of specific examples, the embodiments described herein, or other embodiments, may be implemented by any suitable computing devices, including, but not limited to, laptop computers, desktop computers, smart phones, tablet computers, dedicated signature tablets, or combinations of such devices.

Figure 10:
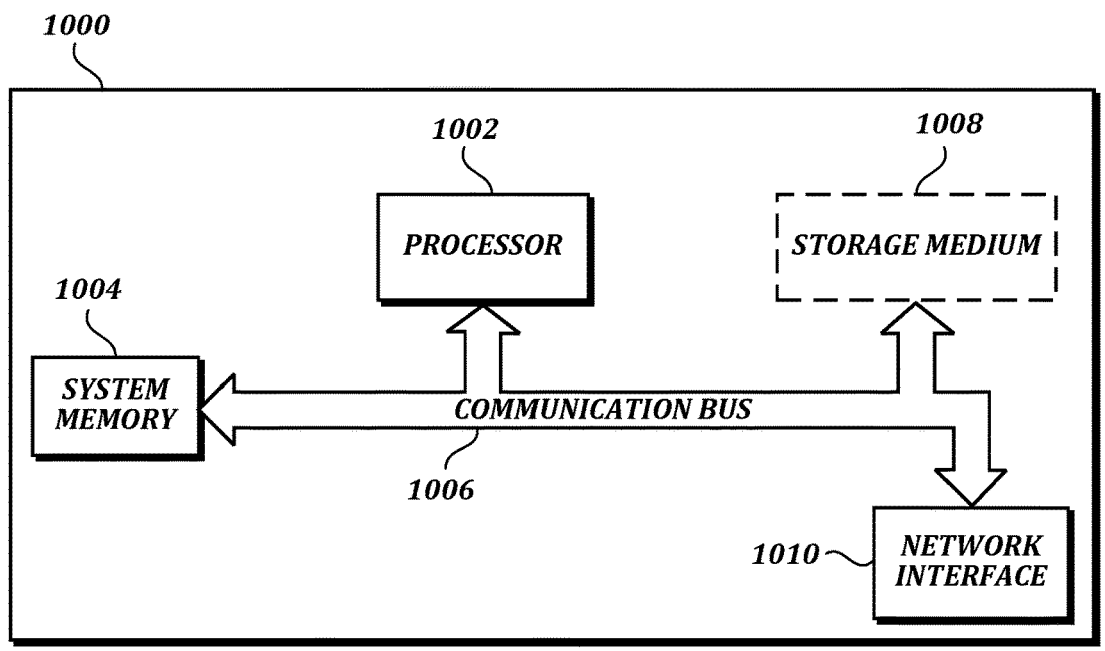
FIG. 10 is a block diagram that illustrates aspects of an illustrative computing device appropriate for use in accordance with described embodiments.

FIG. 10 is a block diagram that illustrates aspects of an illustrative computing device 1000 appropriate for use in accordance with embodiments of the present disclosure. The description below is applicable to servers, personal computers, mobile phones, smart phones, tablet computers, embedded computing devices, and other currently available or yet to be developed devices that may be used in accordance with embodiments of the present disclosure.

In its most basic configuration, the computing device 1000 includes at least one processor 1002 and a system memory 1004 connected by a communication bus 1006. Depending on the exact configuration and type of device, the system memory 1004 may be volatile or nonvolatile memory, such as read only memory ("ROM"), random access memory ("RAM"), EEPROM, flash memory, or other memory technology. Those of ordinary skill in the art and others will recognize that system memory 1004 typically stores data and/or program modules that are immediately accessible to and/or currently being operated on by the processor 1002. In this regard, the processor 1002 may serve as a computational center of the computing device 1000 by supporting the execution of instructions.

As further illustrated in FIG. 10, the computing device 1000 may include a network interface 1010 comprising one or more components for communicating with other devices over a network. Embodiments of the present disclosure may access basic services that utilize the network interface 1010 to perform communications using common network protocols. The network interface 1010 may also include a wireless network interface configured to communicate via one or more wireless communication protocols, such as WiFi, 2G, 3G, 4G, LTE, WiMAX, Bluetooth, and/or the like.

In FIG. 10, the computing device 1000 also includes a storage medium 1008. However, services may be accessed using a computing device that does not include means for persisting data to a local storage medium. Therefore, the storage medium 1008 depicted in FIG. 10 is optional. In any event, the storage medium 1008 may be volatile or nonvolatile, removable or non-removable, implemented using any technology capable of storing information such as, but not limited to, a hard drive, solid state drive, CD-ROM, DVD, or other disk storage, magnetic tape, magnetic disk storage, and/or the like.

As used herein, the term "computer readable medium" includes volatile and nonvolatile and removable and non-removable media implemented in any method or technology capable of storing information, such as computer readable instructions, data structures, program modules, or other data. In this regard, the system memory 1004 and storage medium 1008 depicted in FIG. 10 are examples of computer readable media.

For ease of illustration and because it is not important for an understanding of the claimed subject matter, FIG. 10 does not show some of the typical components of many computing devices. In this regard, the computing device 1000 may include input devices, such as a keyboard, keypad, mouse, trackball, microphone, video camera, touchpad, touchscreen, stylus, and/or the like. Such input devices may be coupled to the computing device 1000 by wired or wireless connections including RF, infrared, serial, parallel, Bluetooth, USB, or other suitable connection protocols using wireless or physical connections.

In any of the described examples, data can be captured by input devices (e.g., signature devices) and transmitted or stored for future processing. The processing may include encoding data, which can be subsequently decoded for presentation by output devices. Input devices can be separate from and communicatively coupled to computing device 1000, or can be integral components of the computing device 1000. The computing device 1000 may also include output devices such as a display or touchscreen. The output devices can be separate from and communicatively coupled to the computing device 1000, or can be integral components of the computing device 1000. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, Python, Ruby, HTML, CSS, JavaScript, VBScript, ASPX, Microsoft.NET™ languages such as C #, and/or the like. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer readable medium (e.g., a non-transitory medium such as a memory or storage medium) or computer storage device and be stored on and executed by one or more general purpose or special purpose processors, thus creating a special purpose computing device configured to provide functionality described herein.

IV. EXTENSIONS AND ALTERNATIVES

Many alternatives to and modifications of the embodiments described herein are possible. For example, embodiments described herein can be adapted to mechanisms, algorithms and encryption techniques that are incorporated into current or subsequent iterations of the TLS specification. As one possible modification, PFS (Perfect Forward Secrecy) provides additional steps to establish an encryption key. Embodiments described herein can be easily adapted to take advantage of this additional security, which is contained completely within the TLS framework.

More generally, many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. While illustrative embodiments of the invention have been illustrated and described, it will be appreciated that various changes can be made therein without departing from the spirit and scope of the invention.

The invention claimed is:

1. A computer-implemented method comprising:
   establishing a connection between a signature device and a host computer via an interface, wherein the signature device includes a device certificate as a default level of security, wherein the device certificate comprises a device public key signed by a factory certificate authority using the factory certificate authority's private key and the factory certificate authority's public key signed by a root certificate authority using the root certificate authority's private key;
   establishing a transport layer security (TLS) connection between the signature device and the host computer via the interface,
   by the host computer, sending a command via the interface to the signature device to generate a new key pair consisting of a public key and a private key of the signature device;
   by the host computer, receiving a certificate signing request (CSR) including the signature device's public key from the signature device via the interface;
   by the host computer, sending the CSR to a user certificate authority to obtain a user certificate as an enhancement to the default level of security for the signature device;
   by the host computer, receiving the user certificate from the user certificate authority, wherein the user certificate includes the signature device's public key signed by a private key of the user certificate authority; and
   by the host computer, sending the user certificate to the signature device via the interface.

2. The method of claim 1, wherein the interface is a universal serial bus (USB) interface.

3. The method of claim 2, wherein data is received from or transmitted to the signature device via a USB bulk transfer.

4. The method of claim 3 wherein the signature device acts as a TLS server, and wherein the host computer acts as a TLS client.

5. The method of claim 1 further comprising, by the host computer, receiving encrypted pen data via the interface.

6. The method of claim 1 further comprising, by the host computer, transmitting encrypted control data to the signature device via the interface.

7. The method of claim 1 further comprising, by the host computer, transmitting encrypted image data to the signature device via the interface.

8. The method of claim 1 wherein the public key signed by the user certificate authority is configured to be decrypted with the user certificate authority's public key, and wherein, when the decrypted public key signed by the user certificate authority matches the public key on the signature device, the signature device stores the user certificate and the new key pair, wherein the user certificate replaces the device certificate on the signature device.

9. A host computer programmed to perform steps comprising:
   establishing a connection between a signature device and a host computer via an interface, wherein the signature device includes a device certificate as a default level of security, wherein the device certificate comprises a device public key signed by a factory certificate authority using the factory certificate authority's private key and the factory certificate authority's public key signed by a root certificate authority using the root certificate authority's private key;
   establishing a transport layer security (TLS) connection between the signature device and the host computer via the interface,
   sending a command via the interface to the signature device to generate a new key pair consisting of a public key and a private key of the signature device;
   receiving a certificate signing request (CSR) including the signature device's public key from the signature device via the interface;
   sending the CSR to a user certificate authority to obtain a user certificate as an enhancement to the default level of security for the signature device;
   receiving the user certificate from the user certificate authority, wherein the user certificate includes the signature device's public key signed by a private key of the user certificate authority; and
   sending the user certificate to the signature device via the interface.

10. A non-transitory computer-readable medium having stored thereon instructions configured to cause a host computer to perform steps comprising:
    establishing a connection between a signature device and a host computer via an interface, wherein the signature device includes a device certificate as a default level of security, wherein the device certificate comprises a device public key signed by a factory certificate authority using the factory certificate authority's private key and the factory certificate authority's public key signed by a root certificate authority using the root certificate authority's private key;
    establishing a transport layer security (TLS) connection between the signature device and the host computer via the interface,
    sending a command via the interface to the signature device to generate a new key pair consisting of a public key and a private key of the signature device;
    receiving a certificate signing request (CSR) including the signature device's public key from the signature device via the interface;
    sending the CSR to a user certificate authority to obtain a user certificate as an enhancement to the default level of security for the signature device;
    receiving the user certificate from the user certificate authority, wherein the user certificate includes the signature device's public key signed by a private key of the user certificate authority; and
    sending the user certificate to the signature device via the interface.

11. A signature tablet for use with an external computer, the signature tablet comprising:
  an input sensor configured to detect a series of positions of a pen and generate a series of pen data;
  an input sensor controller connected to the input sensor; and
  a main controller connected to the input sensor controller, the main controller comprising:
    a USB peripheral device interface; and
    a memory storing:
      a key pair comprising a public key and a private key of the signature tablet;
      a server certificate for the public key signed by a factory certificate authority using the factory certificate authority's private key;
      a second certificate with the factory certificate authority's public key signed by a root certificate authority using the root certificate authority's private key; and
      firmware, wherein the firmware is configured to cause the main controller to:
        establish a connection with the external computer over the USB peripheral device interface when the USB peripheral device interface is detected to be connected with the external computer;
        provide the server certificate including the public key and the second certificate to the external computer over the connection; and
        in a case that a response indicating the server certificate is trusted by the external computer is received, send the series of pen data to the external computer.

12. The signature tablet of claim 11, wherein the firmware is further configured to cause the main controller to:
  receive an encrypted shared secret key generated by the external computer over a secure session as the response indicating the server certificate is trusted by the external computer; and
  send the series of pen data by encrypting the series of pen data with the shared secret key.

13. The signature tablet of claim 12, wherein the series of pen data is sent over a TLS or SSL session established directly via the connection over the USB peripheral device interface.

14. The signature tablet of claim 13, wherein the firmware is further configured to cause the main controller to:
  establish a default pipe for exchanging USB device properties and two pipes for USB bulk transfer for two-way communication with the external computer over the USB peripheral device interface,
  wherein the series of pen data is sent over the TLS session established via the two pipes for USB bulk transfer.

15. The signature tablet of claim 11, wherein the firmware is further configured to cause the main controller to:
  generate the key pair in response to a command;
  send a certificate signing request for the public key in order to obtain the server certificate signed by the factory certificate authority; and
  store the server certificate including the public key in the memory.

16. The signature tablet of claim 15, wherein the firmware is further configured to cause the main controller to:
  generate a new key pair of a new public key and a new private key in response to another command;
  send a certificate signing request for the new public key in order to obtain the public key signed by a user certificate authority; and
  update the memory to store the new key pair and a server certificate for the new public key signed by the user certificate authority.

17. The signature tablet of claim 11, wherein the firmware is further configured to cause the main controller to:
  retrieve a client certificate including a public key of the external computer from the external computer;
  determine whether the client certificate is trusted or not; and
  in a case that the client certificate is trusted and the response indicating that the server certificate is trusted by the external computer is received, send the series of pen data to the external computer.

18. The signature tablet of claim 11 further comprising a display connected to the main controller, wherein the firmware is further configured to cause the signature tablet to:
  decrypt encrypted image data sent from the external computer over the connection to obtain image data; and
  display a path of the positions of the pen in a manner such that the path is overlaid with the image data when displayed on the display.

19. The signature tablet of claim 18, wherein the image data represents either a first image for entering a handwriting signature or a second image showing a layout of characters for entering a PIN, and wherein the firmware is further configured to cause the signature tablet to:
  display the path of the positions of the pen in a manner such that the path is overlaid with the first image; and
  display a character selected by the positions in a highlighted manner.

20. A computer system comprising:
  the signature tablet according to claim 11 for use with an external computer; and
  the external computer.

* * * * *